United States Patent
Livne et al.

(10) Patent No.: US 8,949,441 B2
(45) Date of Patent: Feb. 3, 2015

(54) SYSTEM AND METHOD FOR OPTIMIZING MEDIA RESOURCE FOR IMS SCIM/SERVICE BROKERING

(75) Inventors: Shlomo Livne, Ra'anana (IL); Dima Polsky, Jerusalem (IL); Vladimir Furman, Givaat-Ada (IL); Renana Seidman, Ra'anana (IL); Sigal Dina, Ramat-Hasharon (IL); Avi Zohary, Rosh-Haain (IL); Yoel Amram, Rechovot (IL); Amnon Heiman, Tel-Aviv (IL); Nadav Kadosh, Givaataim (IL); Tzach Livyatan, Tel-Aviv (IL)

(73) Assignee: Oracle International Corporation, Redwood Shores, CA (US)

( * ) Notice: Subject to any disclaimer, the term of this patent is extended or adjusted under 35 U.S.C. 154(b) by 368 days.

(21) Appl. No.: 13/584,498

(22) Filed: Aug. 13, 2012

(65) Prior Publication Data
US 2014/0047090 A1 Feb. 13, 2014

(51) Int. Cl.
*G06F 15/16* (2006.01)
*G06F 15/173* (2006.01)

(52) U.S. Cl.
USPC ............................ 709/227; 709/228; 709/226

(58) Field of Classification Search
None
See application file for complete search history.

(56) References Cited

U.S. PATENT DOCUMENTS

| | | | |
|---|---|---|---|
| 6,760,417 B1 | 7/2004 | Wallenius | |
| 7,136,913 B2 | 11/2006 | Linderman | |
| 7,483,438 B2 | 1/2009 | Serghi et al. | |
| 8,296,409 B2 | 10/2012 | Banerjee et al. | |
| 2002/0025795 A1 | 2/2002 | Sharon et al. | |
| 2003/0028790 A1 | 2/2003 | Bleumer et al. | |
| 2004/0009762 A1 | 1/2004 | Bugiu et al. | |
| 2005/0245230 A1 | 11/2005 | Benco et al. | |
| 2007/0106801 A1 | 5/2007 | Jansson | |
| 2007/0143470 A1 | 6/2007 | Sylvain | |
| 2008/0103923 A1 | 5/2008 | Rieck et al. | |
| 2009/0268715 A1 | 10/2009 | Jansson | |
| 2011/0082920 A1 | 4/2011 | Bhattacharya et al. | |

OTHER PUBLICATIONS

BEA, WebLogic Network Gatekeeper, Architectural Overview, Version 3.0, 112 pages, Sep. 2007.
Chen et al., Applying SOA and Web 2.0 to Telecom: Legacy and IMS Next-Generation Architectures, IEEE, 6 pages, 2008.
Oracle Communication Services Gatekeeper Concepts and Architectural Overview, Release 4.1, Oracle, 94 pages, Jan. 2009.

*Primary Examiner* — Ranodhi Serrao
(74) *Attorney, Agent, or Firm* — Meyer IP Law Group

(57) ABSTRACT

In accordance with various embodiments, systems and methods that improve communication with a media server are provided. Such a system can include a plurality of applications, executing on one or more application servers. The system can also include a media server which is operable to play announcements requested by the plurality of applications to one or more parties in a call; and a SCIM. The SCIM is operable to buffer requests from the plurality of applications to play the announcements. When an application in a chain of applications requests that an announcement be played to a party, the SCIM can buffer the request, communicate with each remaining application in the chain of applications and buffer any requests to play an additional announcement to the party, open a connection to the media server, and instruct the media server to play each announcement associated with each buffered request.

20 Claims, 5 Drawing Sheets

Figure 5A

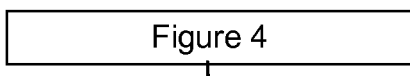

If the application requests that a first announcement be played, and a second application also requests that the first announcement be played, electing, by the SCIM, not to buffer the request from the second application. — 500

Figure 5B

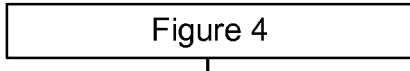

Providing a plurality of media servers, each operable to play a different plurality of announcements. — 502

Indicating, in each request to play an announcement from one of the plurality of applications, a destination media server from among the plurality of media servers. — 504

Figure 5C

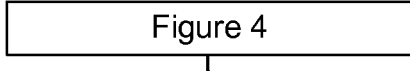

Opening a connection by the SCIM to the media server and optionally including a service data point (SDP) of the party. — 506

Sending, by the SCIM, a SDP of the media server to the party. — 508

SYSTEM AND METHOD FOR OPTIMIZING MEDIA RESOURCE FOR IMS SCIM/SERVICE BROKERING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to an application orchestration using an orchestration engine and in particular to a system and method for optimizing media resource for IMS SCIM/Service Brokering.

BACKGROUND

Orchestration engines, such as a Service Control Interaction Management (SCIM) enable users to use multiple applications from multiple vendors to create custom solutions, without tying the user to a particular vendor for all applications and services. Typically, applications managed by the SCIM are not aware of each other. One disadvantage of this modularization is that it increases overhead as each independent application may make redundant requests. One example of this redundancy can appear in the utilization of media resources on a network. As used herein, media resources can refer to entities which play announcements on a network. Typically, when multiple applications in a chain of applications seek to play announcements to a party in a call, each application in its turn must separately open and close a connection to a media server which will play the announcement. In a large chain of applications in which many applications seek to play an announcement, the signaling required to open and close the connection to the media server, the signaling required to transfer the media resource information back to the client, the allocation and de-allocation of resources in the media server for each opening/closing of a connection, and the allocation and de-allocation on the client side of resources for each connection can all add up to a significant overhead.

SUMMARY

In accordance with various embodiments, systems and methods that improve communication with a media server are provided. Such a system can include a plurality of applications, executing on one or more application servers. The system can also include a media server which is operable to play announcements requested by the plurality of applications to one or more parties to a call, and a SCIM. The SCIM is operable to buffer requests from the plurality of applications to play the announcements. When an application in a chain of applications requests that an announcement be played to a party, the SCIM can buffer the request, communicate with each remaining application in the chain of applications and buffer any requests to play an additional announcement to the party, open a connection to the media server once, and instruct the media server to play each announcement associated with each buffered request.

BRIEF DESCRIPTION OF THE DRAWINGS

FIGS. 5A-5C show additional embodiments of the method shown in FIG. 4, in accordance with various embodiments of the invention.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Embodiments of the present invention improve the utilization of media resources in the case of application orchestration, by buffering requests to play announcements from multiple applications and then opening one connection to the media server and playing all of the announcements indicated in the buffered requests.

Figure 1:
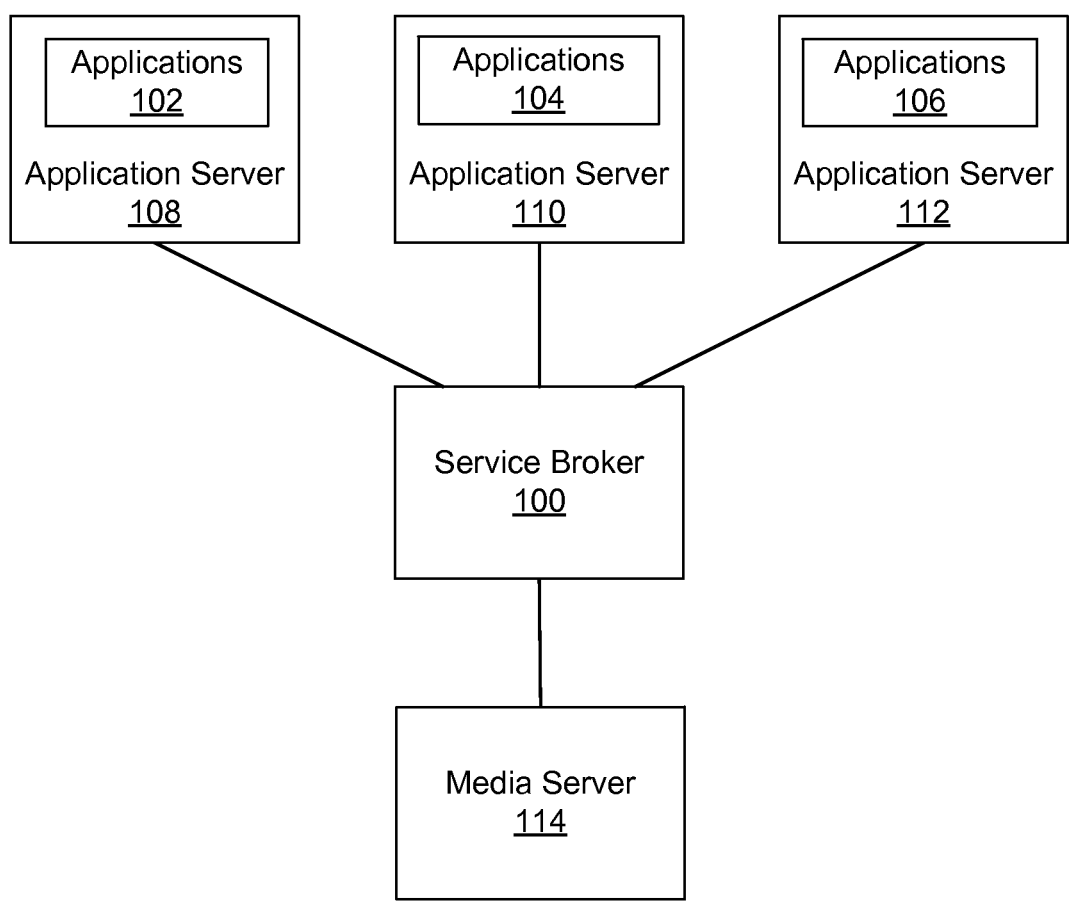
FIG. 1 shows a Service Control Interaction Management (SCIM)/Service Broker, in accordance with an embodiment of the invention.

FIG. 1 shows a Service Control Interaction Management (SCIM)/Service Broker, in accordance with an embodiment of the invention. The SCIM 100 can orchestrate, or chain together, multiple applications 102-106 across different application servers 108-112. Each of the plurality of application servers can include a plurality of applications. SCIM orchestration is done according to the signaling from the network. Each application can request that announcements be played to a party in a call. For example an announcement can alert a caller as to how many minutes are available for the call. When an application makes such a request, the SCIM 100 can open a connection between a media server 114 and the party in the call.

Figure 2:
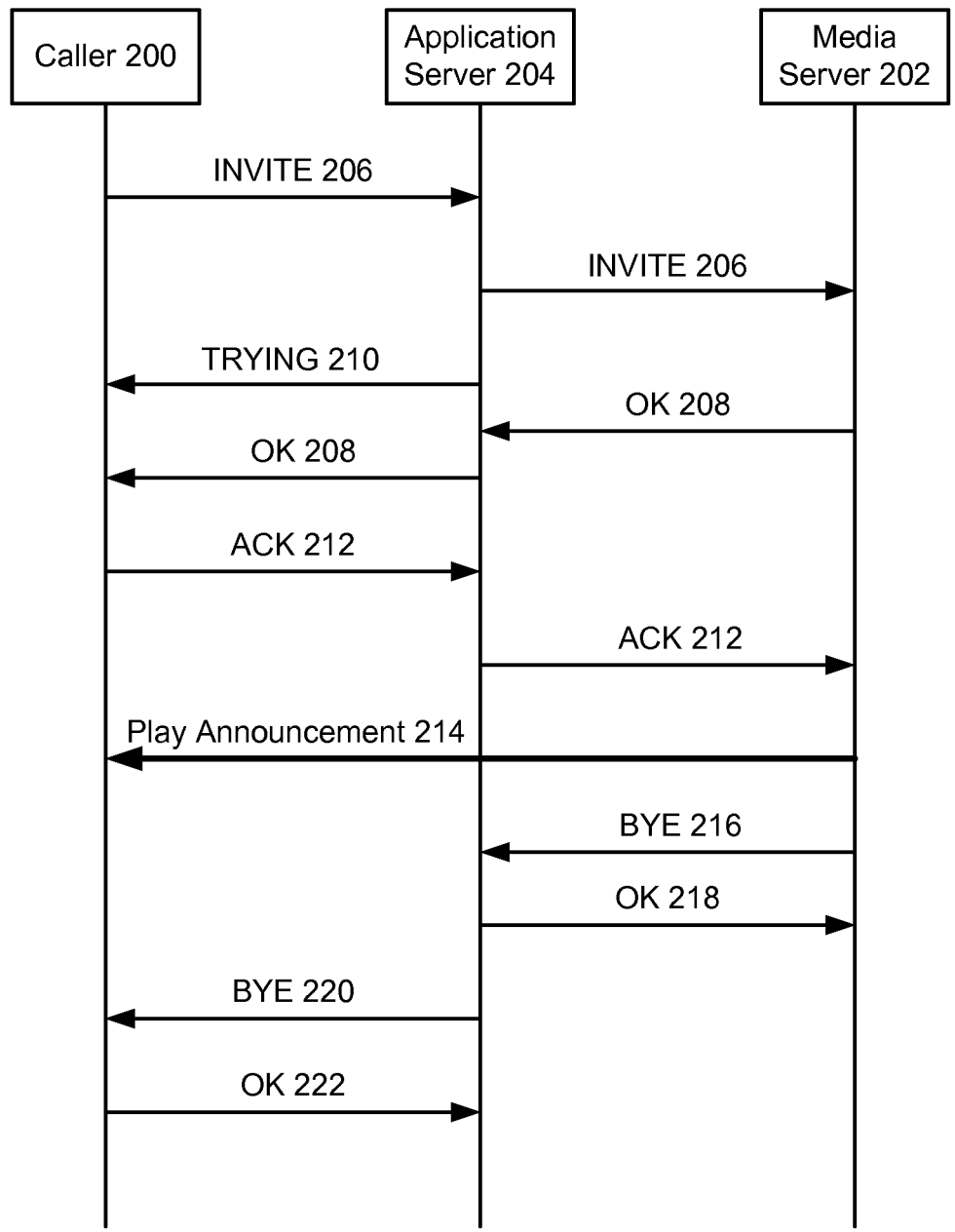
FIG. 2 shows a sequence diagram of setting up a connection between a caller and a media resource.

As shown above, SCIM/Service Brokering can allow operators to chain together multiple applications to serve a single session. In many cases, applications that interact with the user need to play announcements (e.g. BillShock, Advice Of Charge (AoC), FirstCall etc.). Each application, in turn, can connect the session to a Media Resource Function on a media server and play announcements. Setting up, and closing, the connection for each application in the chain incurs an overhead (additional signaling/processing/resource allocation/de-allocation, etc.). This overhead can affect network utilization in several ways. For example, the overhead can manifest itself as longer session setup time, as each application requires setting up and closing the connection, and as additional signaling needed to setup and close the connections, as well as to maintain the open session with the user FIG. 2 shows a sequence diagram of setting up a connection between a caller and a media resource. As shown in FIG. 2, each time an announcement is played, there are at least five signaling messages to maintain a connection between a caller 200 and a media server 202. These messages flow through the Application Server 204. The first signaling message is INVITE 206 which is sent from the caller 200, to the application server 204, which decides to connect the caller to the media server 202. When the INVITE is accepted, a second signaling message, OK message 208, is returned from the media server 202 to the application server 202 and the application server returns the OK back to the caller. While the caller 200 is waiting for the OK to be returned, the application server 204 can send a trying message 210 to the caller. When the caller 200 has received the OK message 208, the caller can respond with a third signaling message, acknowledgement 212, and a connection 214 is opened between the media server 202 and the caller 200 to play the announcement. After playing the announcement, two more signaling messages are needed to close the connection to the media server 202: BYE 216 and OK 218 toward the media server. Subsequently, signaling messages BYE 220 and OK 222 can close the connection to the caller.

Additionally, if following the announcement the call should continue, which is a common case for user interaction during session processing, e,g, charging, then there are an additional two messages (i.e., "SIP REINVITE+SIP OK"/ "SIP 183+SIP PRACK" messages) needed to change the media stream. Furthermore, this sequence of messages is needed each time an application in the chain requests that an announcement be played. Thus, in the case of orchestrating multiple applications, each application will need to setup the connection, close the connection and exchange information with the media server.

Figure 3:
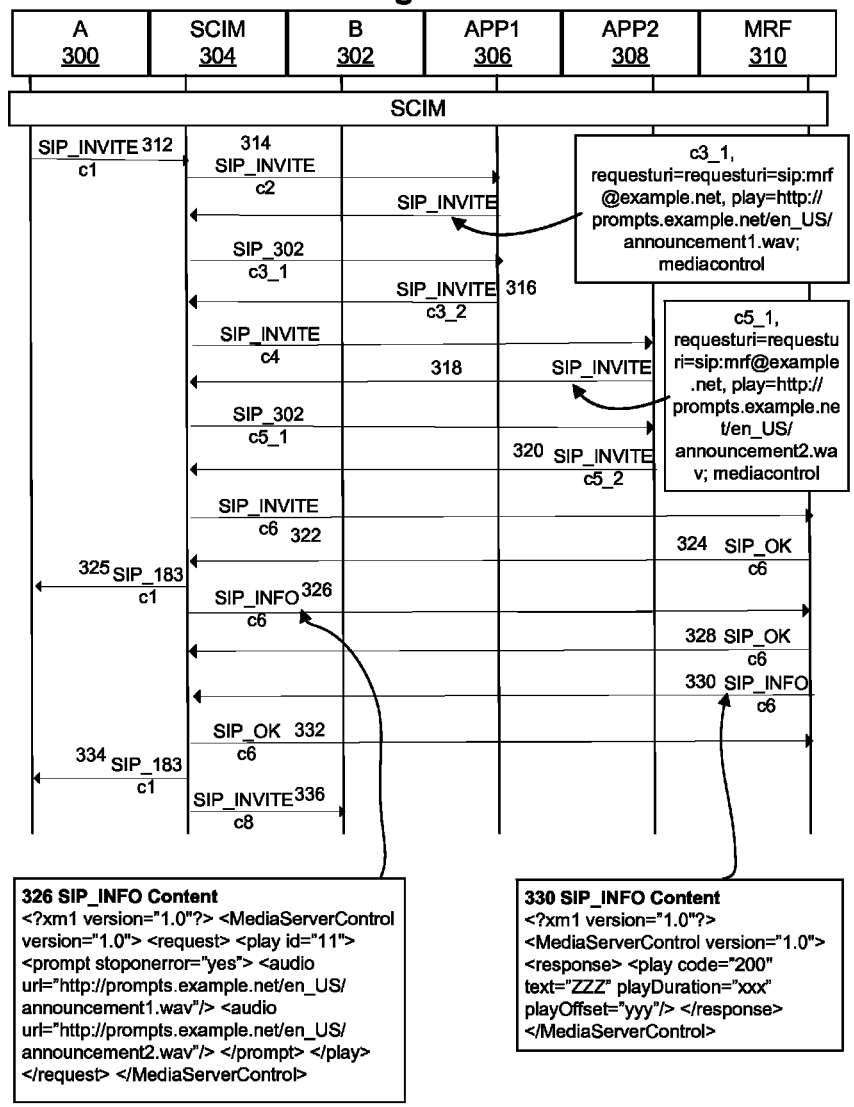
FIG. 3 show sequence diagrams of an improved method of connecting to a media server, in accordance with an embodiment of the invention.

FIG. 3 shows sequence diagrams of an improved method of connecting to a media server, in accordance with an embodiment of the invention. Announcements requested by different applications in a chain can be aggregated and played at once. This means that a connection between the caller and the media server can be opened once and then announcements from all of the applications can be played, minimizing the overhead of setting connections.

As shown in FIG. 3, when a calling party A 300 makes a call to called party B 302, a SCIM 304 can invoke applications in a chain of applications to process the call. In the example shown in FIG. 3, the application chain includes APP1 306 and APP2 308. These applications can request that announcements be played to party A and/or party B through a media resource function (MRF) 310 at a media server. At 312, party A 300 sends a request to call party B 302 to the SCIM 304. At 314, the SCIM invokes APP1 306, which responds with a request to play an announcement. The request includes a request URI 315, a play token 317 and a media control token 319. In this example, the request URI is requestURI=sip: mrf@example.net. The play token is play=http://prompts.example.net/en_US/announcement1.wav and the media control token is mediacontrol. The media control token is an extension that supports aggregation and translation into media server control markup language (MSCML), which is an XML based language used to specify how announcements are to be played and how information is to be collected. The media control token indicates to the SCIM that APP1 306 wants the announcement to be played, but does not need to wait until the announcement has been played to finish. The SCIM 304 responds at 316 with a redirect message (SIP_302) that indicates to APP1 306 the request to play the announcement has not been completed, but that processing can move on. The SCIM buffers the request from APP1.

At 318, the SCIM 304 invokes APP2 308 which responds with a request to play a different announcement. This request similarly includes a media control token and as such the SCIM 304 responds with a redirect message at 320 and buffers the request from APP2 308. The SCIM can then determine that there are no applications left in the chain and that it has messages buffered to be played to A. Accordingly, at 322 the SCIM 304 opens a connection to the MRF 310 to play the announcements. The MRF 310 responds with an OK message 324 which includes a service data point (SDP) for the MRF. At 325, The SCIM 304 can then send the SDP of the MRF to party A 300 to establish a voice path. The SCIM 304 can then send an INFO message 326 to the MRF 310 requesting playing of announcements. The INFO message can include MSCML instructions on how to play the messages, an example of which is shown at 326, and the MRF responds with an OK message 328. The exemplary MSCML instructions shown at 326 comprise:

```
<?xml version="1.0"?><MediaServerControl
version="1.0"><request><play id="11">
<prompt stoponerror="yes">
<audio
url=http://prompts.example.net/en_US?announcement1.wav/>
<audio
url=http://prompts.example.net/en_US?announcement2.wav/>
</prompt>
</play></request>
</MediaServerControl>
```

At 330, after the announcements have been played, the MRF 310 can send to the SCIM 304 a INFO message indicating that the play is complete. The exemplary MSCML response shown at 330 comprise:

```
<?xml version="1.0"?> <MediaServerControl
version="1.0"> <response> <play code="200"
text="ZZZ" playDuration="xxx"
playOffset="yyy"/> </response>
</MediaServerControl>
```

At 334, the SCIM can disconnect party A from the MRF. The SCIM can also disconnect the MRF from party A by sending a BYE message (not shown). At 336, the SCIM connects party A to party B.

In accordance with an embodiment of the invention, applications can request that announcements be played to multiple parties on a call. This can include playing the same announcement to multiple parties or playing different announcements to different parties. In this case, the SCIM can track how each application and the media server is connected to the parties. For example, a media server can be connected to multiple parties via different legs. If a first announcement is to be played to party 1 and a second announcement is to be played to party 2, the SCIM can track which leg connects the media server to which party to ensure that the correct announcement is played to the intended party. This information can be included with the INVITE message that includes the play token. Additionally, once the announcements have been played, the leg information can be used to close the corresponding connections between the parties and the MRF.

In accordance with an embodiment of the invention, multiple MRFs can be connected to the SCIM. In this case, requests are aggregated based on which MRF is designated as the destination MRF for that request. The INVITE message which includes the play token can include the identity of the destination MRF. The SCIM can stop aggregating announcements, and play the collected announcements, when signaling is destined to the network elements.

Additionally, when more than one application indicates it wants to play the same message, the SCIM can remove one of the requests from the buffer, eliminating what would otherwise have been duplicative announcements. Further, where MRFs are not homogenous (e.g., the MRFs have different capacity and/or support different functionality), knowing the set of interactions needed to be executed (e.g., the buffered requests) enables the SCIM to take all the required announcements into consideration for the selection of the MRF that will play the announcements.

Figure 4:
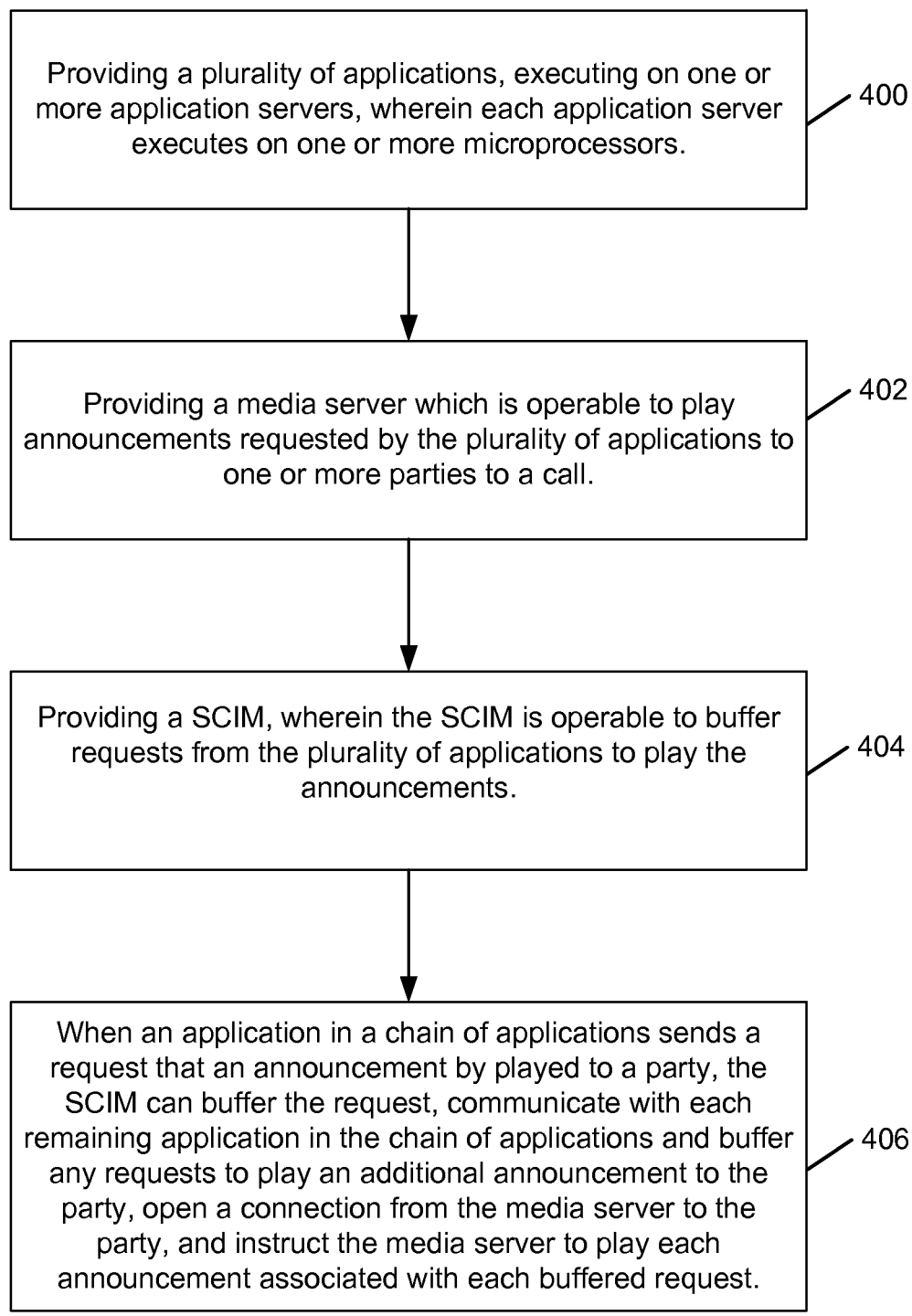
FIG. 4 shows an improved method of connecting to a media server, in accordance with an embodiment of the invention.

FIG. 4 shows an improved method of connecting to a media server, in accordance with an embodiment of the invention. As shown in FIG. 4, at step 400 a plurality of applications, executing on one or more application servers, are provided. Each application server executes on one or more microprocessors. At step 402, a media server which is operable to play announcements requested by the plurality of applications to one or more parties to a call, is provided. At step 404, a SCIM is provided. The SCIM is operable to buffer requests from the plurality of applications to play the announcements. At step 406, when an application in a chain of applications requests that an announcement be played to a party, the SCIM can buffer the request, communicate with each remaining application in the chain of applications and buffer any requests to play an additional announcement to the party, open a connection to the media server, and instruct the media server to play each announcement associated with each buffered request. In accordance with an embodiment, the request can include a play token identifying a location of the announcement to be played and a media control token indicating that the request can be buffered.

FIGS. 5A-5C show additional embodiments of the method shown in FIG. 4, in accordance with various embodiments of the invention. As shown in FIG. 5A, at 500, the method shown in FIG. 4 can further comprise the step of if the application requests that a first announcement be played, and a second application also requests that the first announcement be played, electing, by the SCIM, not to buffer the request from the second application. As shown in FIG. 5B, at 502, the method shown in FIG. 4 can also comprise the step of providing a plurality of media servers, each operable to play a different plurality of announcements, and at 504, indicating, in each request to play an announcement from one of the plurality of applications, a destination media server from among the plurality of media servers. Additionally, as shown in FIG. 5C, opening a connection from the party to the media server can comprise at 506 the step of opening a connection, by the SCIM, and optionally including a service data point (SDP) of the party to the media server; and at 508 sending, by the SCIM, a SDP of the media server to the party.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system that improves communication and resources of a media server, comprising:
    one or more microprocessor;
    a plurality of applications, executing on one or more application servers;
    a media server which is operable to play announcements requested by the plurality of applications to one or more parties to a call;
    a Service Capability Interaction Manager (SCIM) operating on said one or more microprocessor, wherein the SCIM is configured to buffer requests from the plurality of applications to play the announcements;
    wherein when an application in a chain of applications sends a request that an announcement be played to a party, wherein the request includes an identification of a location of the announcement to be played and an indication that the request can be buffered, the SCIM is configured to
        buffer the request,
        communicate with each remaining application in the chain of applications and buffer any requests to play an additional announcement to the party,
        open a connection from the media server to the party, and
        instruct the media server to play each announcement associated with each buffered request; and
    wherein if the application requests that a first announcement be played, and a second application also requests that the first announcement be played, the SCIM can elect not to buffer the request from the second application.

2. The system of claim 1, wherein the identification of a location of the announcement to be played comprises a play token identifying a location of the announcement to be played and the indication that the request can be buffered comprises a media control token indicating that the request can be buffered.

3. The system of claim 1, wherein the identification of a location of the announcement to be played comprises a uniform resource identifier (URI).

4. The system of claim 1, further comprising:
a plurality of media servers, each operable to play a different plurality of announcements;
wherein each request to play an announcement from one of the plurality of applications can indicate a destination media server from among the plurality of media servers.

5. The system of claim 1, wherein the SCIM opens a connection to the media server and optionally includes a service data point (SDP) of the party and sends a SDP of the media server to the party to open the connection from the media server to the party.

6. The system of claim 1, wherein the media server is operable to play different announcements to more than one party.

7. The system of claim 1, wherein the SCIM is a service control interaction management (SCIM)/service broker.

8. A method that improves communication with a media server, comprising:
providing a plurality of applications, executing on one or more application servers, wherein each application server executes on one or more microprocessors;
providing a media server which is operable to play announcements requested by the plurality of applications to one or more parties to a call;
providing a Service Capability Interaction Manager (SCIM) operating on one or more microprocessor, wherein the SCIM is configured to buffer requests from the plurality of applications to play the announcements;
when an application in a chain of applications sends a request that an announcement be played to a party wherein the request includes an identification of a location of the announcement to be played and an indication that the request can be buffered, the SCIM performs step comprising:
buffering the request,
communicating with each remaining application in the chain of applications and buffering any requests to play an additional announcement to the party, opening a connection from the media server to the party, and
instructing the media server to play each announcement associated with each buffered request; and
wherein if the application requests that a first announcement be played, and a second application also requests that the first announcement be played, the SCIM can elect not to buffer the request from the second application.

9. The method of claim 8, wherein the identification of a location of the announcement to be played comprises a play token identifying a location of the announcement to be played and the indication that the request can be buffered comprises a media control token indicating that the request can be buffered.

10. The method of claim 8, wherein the identification of a location of the announcement to be played comprises a uniform resource identifier (URI).

11. The method of claim 8, further comprising:
providing a plurality of media servers, each operable to play a different plurality of announcements;
indicating, in each request to play an announcement from one of the plurality of applications, a destination media server from among the plurality of media servers.

12. The method of claim 8, wherein opening a connection from the media server to the party comprises:
opening a connection by the SCIM to the media server and optionally including a service data point (SDP) of the party; and
sending, by the SCIM, a SDP of the media server to the party.

13. The method of claim 8, wherein the media server is operable to play different announcements to more than one party.

14. The method of claim 8, wherein the SCIM is a service control interaction management (SCIM)/service broker.

15. A non-transitory computer readable storage medium including instructions stored thereon which, when executed by a computer, cause the computer to perform steps comprising:
providing a plurality of applications, executing on one or more application servers, wherein each application server executes on one or more microprocessors;
providing a media server which is operable to play announcements requested by the plurality of applications to one or more parties to a call;
providing a Service Capability Interaction Manager (SCIMI, wherein the SCIM is configured to buffer requests from the plurality of applications to play the announcements;
when an application in a chain of applications sends a request that an announcement be by played to a party wherein the request includes an identification of a location of the announcement to be played and an indication that the request can be buffered, the SCIM performs steps comprising:
buffering the request,
communicating with each remaining application in the chain of applications and buffering any requests to play an additional announcement to the party,
opening a connection from the media server to the party, and
instructing the media server to play each announcement associated with each buffered request; and
wherein if the application requests that a first announcement be played, and a second application also requests that the first announcement be played, the SCIM can elect not to buffer the request from the second application.

16. The non-transitory computer readable storage medium of claim 15, wherein the identification of a location of the announcement to be played comprises a play token identifying a location of the announcement to be played and the indication that the request can be buffered comprises a media control token indicating that the request can be buffered.

17. The non-transitory computer readable storage medium of claim 15, wherein the identification of a location of the announcement to be played comprises a uniform resource identifier (URI).

18. The non-transitory computer readable storage medium of claim 15, further comprising:
providing a plurality of media servers, each operable to play a different plurality of announcements;
indicating, in each request to play an announcement from one of the plurality of applications, a destination media server from among the plurality of media servers.

19. The non-transitory computer readable storage medium of claim 15, wherein opening a connection from the media server to the party comprises:
opening a connection by the SCIM to the media server and optionally including a service data point (SDP) of the party; and sending, by the SCIM, a SDP of the media server to the party.

20. The non-transitory computer readable storage medium of claim 15, wherein the media server is operable to play different announcements to more than one party.

* * * * *

UNITED STATES PATENT AND TRADEMARK OFFICE
CERTIFICATE OF CORRECTION

| | | |
|---|---|---|
| PATENT NO. | : 8,949,441 B2 | Page 1 of 1 |
| APPLICATION NO. | : 13/584498 | |
| DATED | : February 3, 2015 | |
| INVENTOR(S) | : Shlomo Livne et al. | |

It is certified that error appears in the above-identified patent and that said Letters Patent is hereby corrected as shown below:

Title Page, Item (75)

Inventors, line 3, delete "Givaat-Ada (IL);" and insert -- Givat-Ada (IL); --, therefor.

Inventors, line 6, delete "Rosh-Haain (IL);" and insert -- Rosh HaAvin (IL); --, therefor.

Inventors, line 9, delete "Givaataim (IL);" and insert -- Givatayim (IL); --, therefor.

In the specification

Column 3, line 2, delete "user" and insert -- user. --, therefor.

Column 3, line 28, delete "e,g," and insert -- e.g. --, therefor.

Column 3, line 59, delete "mediacontrol." and insert -- media control. --, therefor.

Column 8, line 23, delete "(SCIMI," and insert -- (SCIM), --, therefor.

Column 8, line 27, delete "be by" and insert -- be --, therefor.

Signed and Sealed this
Third Day of May, 2016

Michelle K. Lee
*Director of the United States Patent and Trademark Office*